United States Patent
McHugh et al.

(10) Patent No.: US 12,373,438 B1
(45) Date of Patent: Jul. 29, 2025

(54) DATABASE LIKE PEEKING

(71) Applicant: Salesforce, Inc., San Francisco, CA (US)

(72) Inventors: Colm McHugh, Dublin (IE); Bradley Glasbergen, Squamish (CA); Prateek Swamy, Livermore, CA (US); Yi Xia, Los Angeles, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/423,983

(22) Filed: Jan. 26, 2024

(51) Int. Cl.
  *G06F 16/24* (2019.01)
  *G06F 16/22* (2019.01)
  *G06F 16/2453* (2019.01)
  *G06F 16/2455* (2019.01)

(52) U.S. Cl.
  CPC ........ *G06F 16/24553* (2019.01); *G06F 16/22* (2019.01); *G06F 16/24537* (2019.01); *G06F 16/24542* (2019.01)

(58) Field of Classification Search
  CPC .............. G06F 16/24553; G06F 16/22; G06F 16/24537; G06F 16/24542
  See application file for complete search history.

(56) References Cited

U.S. PATENT DOCUMENTS

| | | |
|---|---|---|
| 6,996,557 B1 | 2/2006 | Leung et al. |
| 9,244,979 B2 | 1/2016 | Zhang et al. |
| 2014/0214754 A1* | 7/2014 | Li .................... G06F 16/24524 707/603 |
| 2016/0350371 A1* | 12/2016 | Das ....................... G06F 12/023 |
| 2021/0397619 A1* | 12/2021 | Heimel ............... G06F 16/2272 |
| 2023/0205760 A1 | 6/2023 | McHugh et al. |

* cited by examiner

*Primary Examiner* — Apu M Mofiz
*Assistant Examiner* — Cindy Nguyen
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to query planning and execution. A computer system can receive a database statement that comprises a LIKE predicate that defines a set of pattern parameters. The computer system may generate first and second query paths for a query plan associated with the database statement. The first query path utilizes an index associated with a database table specified by the database statement while the second query path does not utilize the index. The computer system executes the database statement in accordance with the query plan and values that are provided for the set of pattern parameters. As a part of executing the database statement, the computer system may evaluate those values to determine whether they are prefix constants and execute the first query path instead of the second query path if all the values are prefix constants.

20 Claims, 8 Drawing Sheets

Table 120

| User ID Field 125A | Name Field 125B | City Field 125C | Age Field 125D |
|---|---|---|---|
| 03234 | John | Austin | 42 |
| 12321 | Abel | Chicago | 56 |
| 29302 | Kevin | Miami | 29 |
| 34389 | Allen | Austin | 74 |
| 34580 | Abigail | Portland | 43 |
| ... | ... | ... | ... |
| 98212 | Bill | Phoenix | 32 |

Index 130

| User ID Field 125A | Name Field 125B |
|---|---|
| 12321 | Abel |
| 34580 | Abigail |
| 34389 | Allen |
| 98212 | Bill |
| 43238 | Bob |
| ... | ... |
| 67239 | Zoey |

Database Statement 170

SELECT * FROM Table 120 WHERE <u>Name Field 125B LIKE $1</u>

LIKE Predicate 175

177 Pattern Parameter

FIG. 2

DATABASE LIKE PEEKING

BACKGROUND

Technical Field

This disclosure relates generally to database systems and, more specifically, to various mechanisms relating to query planning and execution.

Description of the Related Art

Enterprises routinely implement database management systems (or, simply "database systems") that enable users to store a collection of information in an organized manner that can be efficiently accessed and manipulated. The information is often stored in database tables that comprise rows and columns, in which each column defines a grouping of that information. To access information from a database table, a client can issue a request, in the form of a database query, for that information. A query typically specifies criteria for selecting records of the table to be manipulated and/or returned to the requestor. But the database table may be organized in such a manner that it is difficult to efficiently identify the records that satisfy the criteria of the query. In order to improve the execution time of queries against a table, indexes are often built based on columns/fields of the table, where the indexes organize a portion of the data stored in the table in a different manner.

BRIEF DESCRIPTION OF THE DRAWINGS

FIG. 2 is a block diagram illustrating an example database table, an example index, and an example database statement having a LIKE predicate, according to some embodiments.

DETAILED DESCRIPTION

Figure 1:
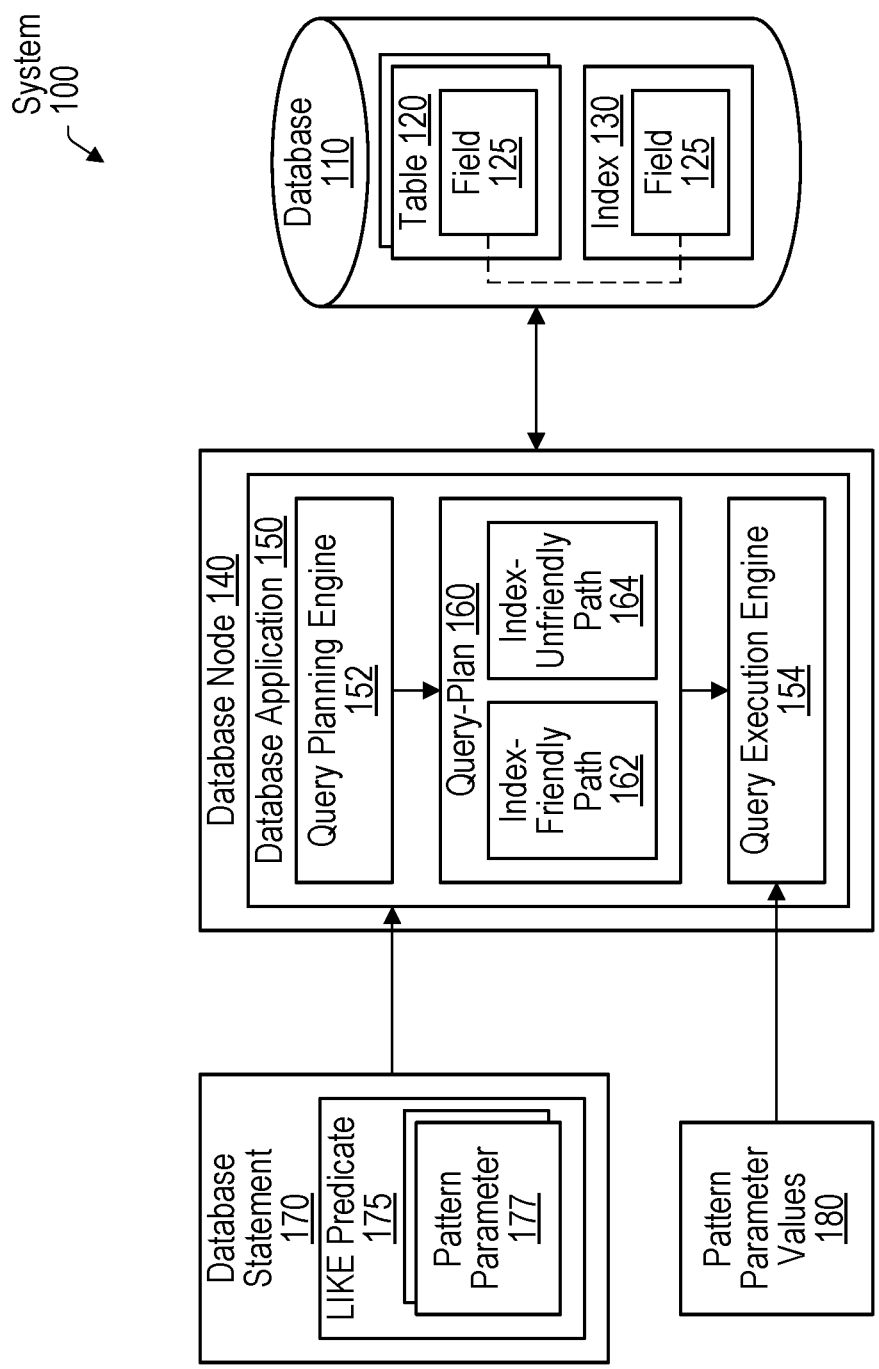
FIG. 1 is a block diagram illustrating example elements of a system having a database and a database node that executes database statements in relation to the database, according to some embodiments.

When a client (e.g., an application node) seeks to access data stored in a database table, the client typically issues a request to the database system that manages that table. That request can specify a database statement having a WHERE clause that includes a condition that affects a selection of the data to be returned and/or manipulated. One type of predicate that is typically allowed by a database system to be included in a WHERE clause is a LIKE predicate. A LIKE predicate is used in a WHERE clause to search for a specified pattern in a column. For example, the database statement "SELECT*FROM t1 WHERE c1 LIKE 'b %'" returns all rows of table t1 whose column c1 start with a "b". To process database statements in a more efficient manner, a database system often uses an index (built on the underlying database table) that corresponds to the condition of a database statement. If a LIKE predicate specifies a pattern that starts with a non-wildcard character (e.g., "b %"), then an index can be used to greatly reduce the amount of data that must be scanned in processing the database statement. In particular, text columns in an index are ordered lexicographically. Thus, if the LIKE predicate specifies "b %," then the database system can jump to the part of the index that starts with "b" and sequentially scan the index until "c". To do so, it derives the predicates ($c1 >= $ 'b': text) AND ($c1 < $ "c": text) that are evaluated once each to determine the start and end of the relevant subportion of the index. This type of LIKE predicate is described as an "index-friendly" LIKE predicate in this disclosure. But if a suffix pattern is specified in a LIKE predicate (e.g., "% b"—to return all rows whose column c1 ends with a "b"), then the database system cannot jump to the offset in that index and start scanning; instead, the whole index must be scanned. This type of LIKE predicate is described as an "index-unfriendly" LIKE predicate in this disclosure.

If a LIKE predicate is index-unfriendly, then it is generally more beneficial to scan the underlying database table and not use an index. Accordingly, when generating a query plan, a database system may consider the characteristics of the pattern specified by a LIKE predicate to determine if it is index-friendly or index-unfriendly. A query plan (or query execution plan) defines a sequence of steps to be performed by the database system to execute a query/database statement on data of a database. When a query is submitted to a database system, the database system may evaluate different possible query plans for executing that query and then carry out the selected query plan. A query plan is typically produced by a database system (specifically, the query optimizer) as the cheapest (lowest cost) plan for executing a query. There may be several query plans for a given query. In the case of LIKE predicates, a database system can generate a first plan that uses an index if the predicate is index-friendly or a second, different plan that does not use the index if the predicate is index-unfriendly. But the pattern specified by a LIKE predicate is not always known before runtime as the pattern can include a placeholder parameter whose value is passed in at runtime. In the cases where it is unknown, the database system can generate a special plan that includes both an index-friendly path and an index-unfriendly path. At execution time, the database system executes exactly once a function to evaluate whether the runtime-provided pattern is index-friendly and selects one of those two paths based on the evaluation. This process is called LIKE peeking in this disclosure. Conventional approaches of LIKE peeking, however, are deficient for various reasons, including that they do not support an array of patterns being specified in a LIKE predicate, they do not support typecasting, and the cost model used in the query planning phase assigns too high of an estimated execution cost to a plan that includes an index-friendly path and an index-unfriendly path. This disclosure addresses, among other things, the technical problem of how to handle arrays of patterns and typecasting and how to improve the cost model to better evaluate the cost of a plan that includes an index-friendly path and an index-unfriendly path.

In various embodiments that are described below, a system comprises a database and a database node that executes database statements in relation to the database. The database node can receive a database statement that comprises a LIKE predicate that defines a set of pattern parameters. The database node generates a query plan for executing the database statement. In various cases, patterns/values for the pattern parameters are supplied during an execution phase of the database statement and not a query planning phase in which the query plan is generated. Accordingly, in various embodiments, the database node includes, in that query plan, an index-friendly path that utilizes an index of a database table that is specified by the database statement and an index-unfriendly path that does not utilize the index. The index-friendly path and the index-unfriendly path may be subpaths of a LIKE peeking path that corresponds to the LIKE peeking approach. In various embodiments, the estimated execution cost of the LIKE peeking path (that is assigned by the database node) is based on the estimated execution cost of the index-friendly path and not the estimated execution cost of the index-unfriendly path. This procedure ensures that the cost of the LIKE peeking path is equivalent to the cost of an index scan for a LIKE predicate where the parameter is known at compile time and has a constant prefix (is index-friendly).

After generating the query plan, the database node may execute the database statement in accordance with the query plan and values that are provided (e.g., in a request to execute the database statement) for the parameter(s) of the LIKE predicate. In various embodiments, the database node evaluates those values to determine whether they are prefix constants. As used herein, the term "prefix constant" refers to a pattern that begins with a non-wildcard character and ends with a wildcard character (e.g., "b %"). A prefix constant stands in contrast to a "suffix constant," which refers to a pattern that begins with a wildcard character and ends with a non-wildcard character (e.g., "% b"). In various embodiments, if all the values are prefix constants, then the database node executes the index-friendly path of the query plan instead of the index-unfriendly path, otherwise, the database node executes the index-unfriendly path instead of the index-friendly path. A LIKE predicate can also specify a cast operation to cast a value from a first data type to a second data type—e.g., "SELECT*FROM t1 WHERE c1 LIKE cast ($1 as TEXT) escape 'a'". During the query planning phase, the database node can determine whether it is possible to cast between those data types and include operations in the query plan to carry out the typecast. If that cast operation can be performed, then the database node performs the cast operation during the execution phase, in various embodiments.

These techniques may be advantageous over prior approaches as these techniques allow for multiple pattern parameters and typecasting in LIKE predicates and enable the cost model to better evaluate the cost of a plan that includes an index-friendly path and an index-unfriendly path. For example, by basing the cost of the LIKE peeking path on the cost of the index-friendly path and not the more expensive cost of the index-unfriendly path, the overall LIKE peeking path becomes more attractive to a query planner compared to an unpeeked equivalent path. As a result, the LIKE peeking path may be incorporated into more query plans that are executed by a database system, saving computing resources of that database system since LIKE peeking-based plans are often more performant than their counterpart unpeeked plans. Furthermore, by implementing mechanisms that allow for multiple pattern values to be specified for a LIKE predicate, more complex LIKE predicates can be provided by a user, so that the user can have better control over the data that is affected by database statements having LIKE predicates. In a similar manner, by supporting CAST operations in LIKE peeking-based plans, a user can cast pattern parameter values between different data types as needed to achieve their desired goal.

Turning now to FIG. 1, a block diagram of a system 100 is shown. System 100 includes a set of components that may be implemented via hardware or a combination of hardware and software. In the illustrated embodiment, system 100 comprises a database 110 and a database node 140. As shown, database 110 includes tables 120 having fields 125 and an index 130 that is based on a field 125, and database node 140 includes a database application 150 and receives a database statement 170 and pattern parameter values 180 (or simply, "patterns 180"). Also as shown, database statement 170 includes a LIKE predicate 175 with pattern parameters 177, and database application 150 includes a query planning engine 152 that provides a query plan 160 to a query execution engine 154 of database application 150. The illustrated embodiment may be implemented differently than shown. For example, pattern parameter values 180 may be received as part of database statement 170, there may be multiple indexes 130 built on table 120, system 100 may include an application node that provides database statement 170 and/or pattern parameter values 180, etc.

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide code, web pages, and other data to users, databases, and entities (e.g., a third-party system) that are associated with system 100. In various embodiments, system 100 is implemented using cloud infrastructure provided by a cloud provider. As such, database 110 and database node 140 may execute on and utilize the available cloud resources of that cloud infrastructure (e.g., computing resources, storage resources, etc.) to facilitate their operation. For example, program code executable to implement the components of database node 140 can be stored on a non-transitory computer-readable medium of server-based hardware included in a datacenter of the cloud provider and executed in a virtual machine hosted on the server-based hardware. In some cases, database node 140 may execute on a computing system of the cloud infrastructure without the assistance of a virtual machine or certain deployment technologies, such as containerization. In some embodiments, system 100 is implemented on local or private infrastructure as opposed to a public cloud.

Database 110, in various embodiments, is a collection of information that is organized in a manner that allows for access, storage, and/or manipulation of that information. Database 110 may include supporting software (e.g., storage servers) that enables database node 140 to carry out those operations (e.g., accessing, storing, etc.) on the information stored at database 110. In various embodiments, database 110 is implemented using a single or multiple storage devices that are connected together on a network (e.g., a storage attached network (SAN)) and configured to redundantly store information in order to prevent data loss. The storage devices may store data persistently and thus database 110 may serve as a persistent storage for system 100.

Further, as discussed, components of system 100 may utilize the available cloud resources of a cloud infrastructure and thus the data of database 110 may be stored using a storage service provided by a cloud provider (e.g., Amazon S3®). In various embodiments, data that is written to database 110 by a database server 140 is accessible to other database servers 140 in a multi-node configuration.

Table 120, in various embodiments, is a database object having a set of data records—that set of data records may be an empty set. Table 120 may store data in an organized structure that comprises columns and rows, in which a column defines an attribute/field 125 and a row corresponds to a record that stores one or more values for the columns. A field 125, in various embodiments, provides structure for table 120 and defines a category of data for which records of table 120 may provide a value. For example, a field 125 may correspond to usernames and thus a record of table 120 may include a value for that field 125 that specifies a username. In various embodiments, the records of table 120 can be sorted (e.g., in ascending or descending order) based on one or more fields 125 of table 120. For example, the records of table 120 may be alphabetically sorted based on the usernames that they provide for a username field 125 of table 120. Record accesses/lookups that search for records based on the one or more fields 125 on which table 120 is sorted may be performed more efficiently than record lookups that search for records based on other fields 125. Continuing the previous example, a lookup for a record associated with a particular username may be performed quicker than a lookup that attempts to locate a record associated with a particular city as all records of table 120 might have to be searched in the latter lookup. To improve the efficiency of lookups that involve a different field 125 than the one by which table 120 is sorted, in various embodiments, indexes 130 are created that are sorted according to the different field 125.

Index 130, in various embodiments, is built based on a field 125 of table 120, although it may be built based on multiple fields 125. The entries in index 130 are sorted based on that field 125 and may include a subset or all of the values of their corresponding records in table 120. The subset of values may include enough information to locate the corresponding record in table 120. Consider an example in which table 120 includes a username field 125 that serves as a primary key and by which table 120 is sorted. As used herein, the phrase "primary key" is used in accordance with its well-understood meaning and refers to a set of fields that are used to uniquely identify a record from all records of a table. For example, a username field may be designated as the primary key field for table 120 and therefore usernames can be used to lookup records of table 120, where no two usernames map to the same record in that table. Returning to the prior example, table 120 may include a city field 125, and index 130 may be built based on that city field 125. Instead of storing all the data of table 120, index 130 may have entries that store, for each entry, a search key value (e.g., a city value) and an associated primary key value (e.g., a username) to the corresponding record. As such, a search of index 130 for records that are associated with a particular city may return a set of primary key values that can be used to locate the actual records in table 120 (in a subsequent search). Queries that are conditioned based on fields 125 by which table 120 is not ordered, in various embodiments are executed against indexes 130. While database tables are discussed, in some embodiments, other database objects may be used (e.g., a document in a non-relational database) and indexes 130 may be created based on those objects. An example of table 120 and index 130 is discussed in greater detail with respect to FIG. 2.

Database node 140, in various embodiments, provides database services, such as data storage, data retrieval, and/or data manipulation. In various embodiments, database node 140 is software that is executable on hardware, while in some embodiments, it encompasses both the hardware and the software. The database services may be provided to components within and/or external to system 100. For example, database node 140 may receive, via an established database connection, a transaction request from an application node of system 100 to perform a database transaction for database 110. A database transaction, in various embodiments, is a logical unit of work (e.g., a specified set of database statements 170) to be performed in relation to database 110. Database statement 170 may be a SQL statement comprising various clauses, such as SELECT, FROM, WHERE, etc. For example, processing a database transaction may include executing a SQL SELECT statement to select and return one or more rows from one or more tables 120. The contents of a row may be specified in a record and thus database node 140 may return one or more records corresponding to the one or more rows. Those one or more records may be returned in a transaction response to the issuer of the corresponding transaction request. An example of database statement 170 is discussed in more detail with respect to FIG. 2.

Database application 150, in various embodiments, is software executable to provide the database services of database node 140. Accordingly, database application 150 can receive database statements 170 (e.g., from an application server) and execute them. In order to execute a given database statement 170, in various embodiments, database application 150 executes a corresponding query plan 160 that defines a sequence of steps to be executed in order to fulfill the given database statement 170. In some cases, database application 150 can generate one or more query plans 160 and execute one of them within a single execution flow (e.g., triggered by a request to execute a certain database statement 170). In some cases, database application 150 receives a request to generate one or more query plans 160 for a certain database statement 170 and separately receives a request to execute that database statement 170 with certain pattern parameter values 180 in accordance with one of those query plans 160. As a part of preparing a given query plan 160 for execution, database application 150 may access a definition for that query plan 160 (e.g., from database 110), compile it into a form that can be executed, and then store it in a local cache of database node 140. In response to a request to execute the associated database statement 170, database application 150 may retrieve and execute the compiled form of that query plan 160. As illustrated, database application 150 includes query planning engine 152 and query execution engine 154.

Query planning engine 152, in various embodiments, is software executable to generate one or more query plans 160 for a database statement 170. Since SQL is declarative, there are typically various alternative ways to execute a given database statement 170, each with varying performance. Accordingly, a given query plan 160 may be a sequence of steps corresponding to one of the possible ways to execute that database statement 170. For example, the illustrated query plan 160 corresponds to one possible way to execute the illustrated database statement 170. To generate a given query plan 160, a database statement 170 may initially be provided as input into a query parser of query planning engine 152. The query parser parses the received database statement 170 and then generates a parse tree based on the parsing. In particular, the query parser separates the pieces of the received database statement 170 into a data structure (e.g., a parse tree) processible by other routines of query planning engine 152. As a part of the parsing process, the query parser may perform one or more checks, such as a syntax check that checks whether the received database statement 170 breaks a database rule, a semantic check that checks whether the objects specified in that database statement 170 exist, etc. The parse tree is provided as input into a query planner of query planning engine 152. The query planner then creates one or more query plans 160 based on the input (e.g., a parse tree) from the query parser. After a set of query plans 160 have been generated, those query plans 160 (or a selected query plan 160) are passed to query execution engine 154.

One type of query plan 160 that can be generated is a LIKE peeking query plan 160. In particular, a database statement 170 may comprise a WHERE clause having a LIKE predicate 175 that is used to search for one or more specified patterns in one or more fields 125. Those patterns are provided as pattern parameter values 180 to pattern parameters 177 defined in the LIKE predicate 175. Pattern parameter values 180 may be passed in during an execution phase or a query planning phase. If pattern parameter values 180 are known during the query planning phase, then, in various embodiments, query planning engine 152 determines whether they are all prefix constants. If they are prefix constants, then query planning engine 152 may generate a query plan 160 having index-friendly path 162. In various embodiments, index-friendly path 162 is a sequence of steps that uses a particular index 130 as a part of executing a corresponding database statement 170. But if at least one pattern parameter value 180 is not a prefix constant, then query planning engine 152 may generate a query plan 160 that includes index-unfriendly path 164. Index-unfriendly path 164, in various embodiments, is a sequence of steps that is not able to effectively use the particular index 130 (used by the index-friendly path 162) as part of executing that corresponding database statement 170. But in the illustrated embodiment, pattern parameter values 180 are passed in separately from database statement 170. As a result, those pattern parameter values for the LIKE predicate are not known during the query planning phase in which query planning engine 152 generates one or more query plans 160 for database statement 170. Because those values are not known during the query planning phase, in various embodiments, query planning engine 152 generates a LIKE peeking query plan 160 that includes index-friendly path 162 and index-friendly path 164. Thus, in the illustrated embodiment, query plan 160 includes both index-friendly path 162 and index-unfriendly path 164.

Query execution engine 154, in various embodiments, is software that is executable to execute database statement 170 according to a particular query plan 160. As part of executing a LIKE peeking query plan 160 that includes index-friendly path 162 and index-friendly path 164, query execution engine 154 may assess whether passed-in pattern parameter values 180 are prefix constants and select one of those two paths to traverse based on that assessment. The assessment is encoded in query plan 160 as a one-time operation (per query execution). As such, in some executions of that query plan 160, query execution engine 154 may use a certain index 130, while in other executions of that query plan 160, query execution engine 154 may not use that index 130, as dependent on passed-in pattern parameter values 180.

Turning now to FIG. 2, a block diagram of an example table 120, an example index 130, and an example database statement 170 is shown. In the illustrated embodiment, table 120 has a user ID field 125A, a name field 125B, a city field 125C, and an age field 125D and various rows that provide values for those fields 125. User ID field 125A may correspond to a primary key field of table 120. Index 130 is created based on name field 125B and thus includes name field 125B and user ID field 125A. Also as shown, index 130 includes the values (from records in table 120) that correspond to name field 125B and user ID field 125A, whose values may be used to access corresponding rows in table 120. In the illustrated embodiment, table 120 is sorted by the values of user ID field 125A, and index 130 is sorted by the values of name field 125B. As further shown, there is a database statement 170 that includes a LIKE predicate 175 having a pattern parameter 177 "$1" (a placeholder variable for which a pattern value 180 can be provided when database statement 170 being invoked). The illustrated embodiment may be implemented differently than shown. For example, there might be multiple indexes 130, LIKE predicate 175 may include multiple pattern parameters 177, and/or database statement 170 may include one or more pattern parameter values 180.

In the illustrated embodiment, database statement 170 includes a WHERE clause. The WHERE clause is used to specify one or more conditional expressions that identify the records that are affected by database statement 170. Those conditional expressions might be joined by ANDs, ORs, and/or NOTs, and are based on one or more fields 125 of table 120. For example, another database statement 170 might specify SELECT*FROM table 120 WHERE age <45 AND city=Austin. In this example, records of table 120 are returned to the requestor if those records include an age value <45 and a city value=Austin. As discussed, record lookups that search for records based on the one or more fields 125 on which table 120 is sorted (i.e., user ID field 125 in FIG. 2) may be performed more efficiently than record lookups that search for records based on other fields 125 of table 120. Thus, in various embodiments, indexes 130 are created that are sorted according to a different field 125 to improve the efficiency of lookups involving the different field 125. In the case of the illustrated embodiment, record lookups that are based on name field 125B may be performed more efficiently by first performing an index scan on index 130 and then accessing table 120 based on the results of the index scan.

LIKE predicates 175 can also benefit from indexes 130 if the LIKE predicates 175 are based on the field(s) 125 by which those indexes are sorted and the pattern(s) specified by the LIKE predicates 175 are prefix constants. For example, if a pattern parameter value 180 "A %" is provided for database statement 170, then database node 140 can perform an index scan on index 130 in which index 130 is scanned to identify records that satisfy the pattern (i.e., "A %"). In various embodiments, an index scan does not have to scan all the entries of index 130 but instead it can start at a particular entry and proceed until it reaches an entry that does not satisfy the pattern. Since index 130 is sorted by name, the index scan may start at the first entry having a name that starts with "A" (for the pattern "A %") and proceed until an entry is located where the name starts with a "B" at which point the index scan can stop scanning. But if a non-prefix value is provided, then using index 130 may hinder, or otherwise not benefit, the execution of database statement 170. For example, if a pattern parameter value 180 "% B" is provided, then database node 140 cannot sequentially scan a subportion of index 130 to locate all the relevant records as an entry that satisfies the pattern may be located anywhere in index 130; it must scan all rows in index 130 to locate all relevant records. As a result, query planning engine 152 may consider whether a given LIKE predicate 175 will benefit from an index scan when generating one or more query plans 160, as discussed in greater detail with respect to FIGS. 3A and 3B.

Figure 3A:
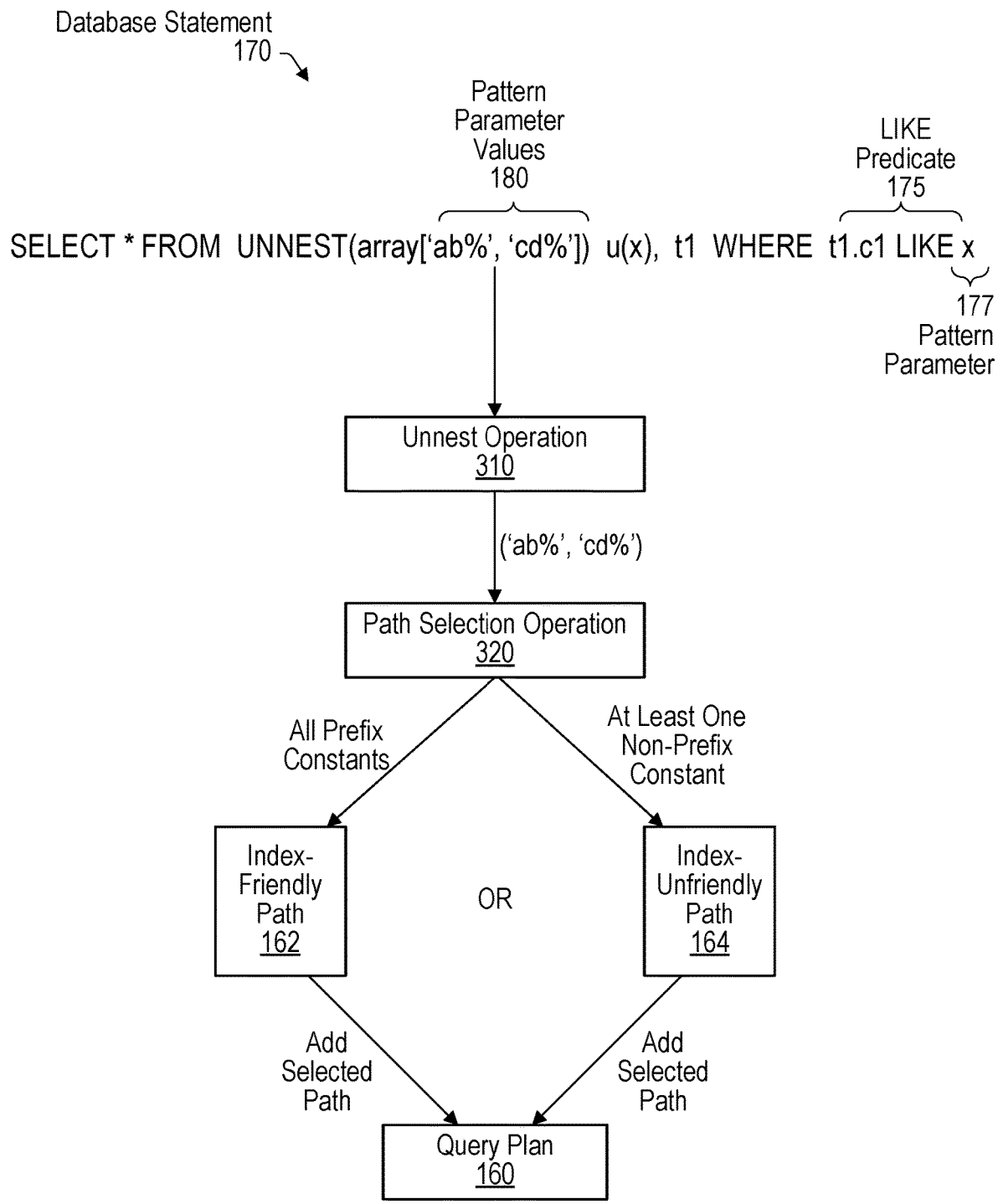
FIGS. 3A-B are block diagrams illustrating example elements that pertain to processing a LIKE predicate involving multiple parameter values, according to some embodiments.

Turning now to FIG. 3A, a block diagram of one example in which a query plan 160 is generated for a database statement 170 that comprises a LIKE predicate 175. In the illustrated embodiment, database statement 170 defines pattern parameter values 180 for LIKE predicate 175. In various cases, pattern parameter values 180 are provided with database statement 170 such that those pattern parameter values 180 are available during the query planning phase in which query plans 160 are generated. In the illustrated embodiment, pattern parameter values 180 for a pattern parameter 177 of LIKE predicate 175 are available during the query planning phase and thus query planning engine 152 generates a query plan 160 with either index-friendly path 162 or index-unfriendly path 164.

To determine whether to incorporate index-friendly path 162 or index-unfriendly path 164 into a certain query plan 160, in various embodiments, query planning engine 152 assesses whether pattern parameter values 180 (available during the query planning phase in FIG. 3A) are prefix constants. In some cases, pattern parameter values 180 may be specified in an array data structure (as shown) and thus database statement 170 specifies an UNNEST operation to extract pattern parameter values from the array data structure. Query planning engine 152 inserts an unnest operation 310 in which pattern parameter values 180 are extracted from that array data structure. Once those pattern parameter values 180 have been extracted and are available for evaluation, then query planning engine 152 executes a path selection operation 320 to evaluate values 180. In various embodiments, path selection operation 320 is an operation in which query planning engine 152 determines whether pattern parameter values 180 are prefix constants and then selects between index-friendly path 162 or index-unfriendly path 164 for inclusion in a LIKE-based query plan 160. In the illustrated embodiment, pattern parameter values 180 are 'ab %' and 'cd %' (which are prefix constants) and thus database statement 170 may benefit from an index scan, which is bounded based on 'ab %' and 'cd %' being used to define respective boundaries for that index scan. Consequently, index-friendly path 162 is incorporated into the illustrated query plan 160. But if pattern parameter values 180 were 'a %,' 'ab % c %," and ' % d' (for example), then index-unfriendly path 164 would be incorporated into query plan 160 as '% d' is not a prefix constant but rather a suffix constant.

Once query plan 160 has been created, in various embodiments, it is provided to query execution engine 154 and query execution engine 154 then executes database statement 170 in accordance with query plan 160. Query execution engine 154 uses an index 130 corresponding to a table "t1" if query plan 160 includes index-friendly path 162; otherwise, query execution engine 154 can instead scan table "t1" or perform other operations instead of an index scan on that index 130 if query plan 160 includes index-unfriendly path 164. In various cases, pattern parameter values 180 are provided during the execution planning phase of a particular database statement 170. As a result, in various embodiments, query plan 160 incorporates index-friendly path 162 and index-unfriendly path 164, and query execution engine 154 may evaluate pattern parameter values 180 to determine which path to proceed down, as discussed in greater detail with respect to FIG. 3B.

Figure 3B:
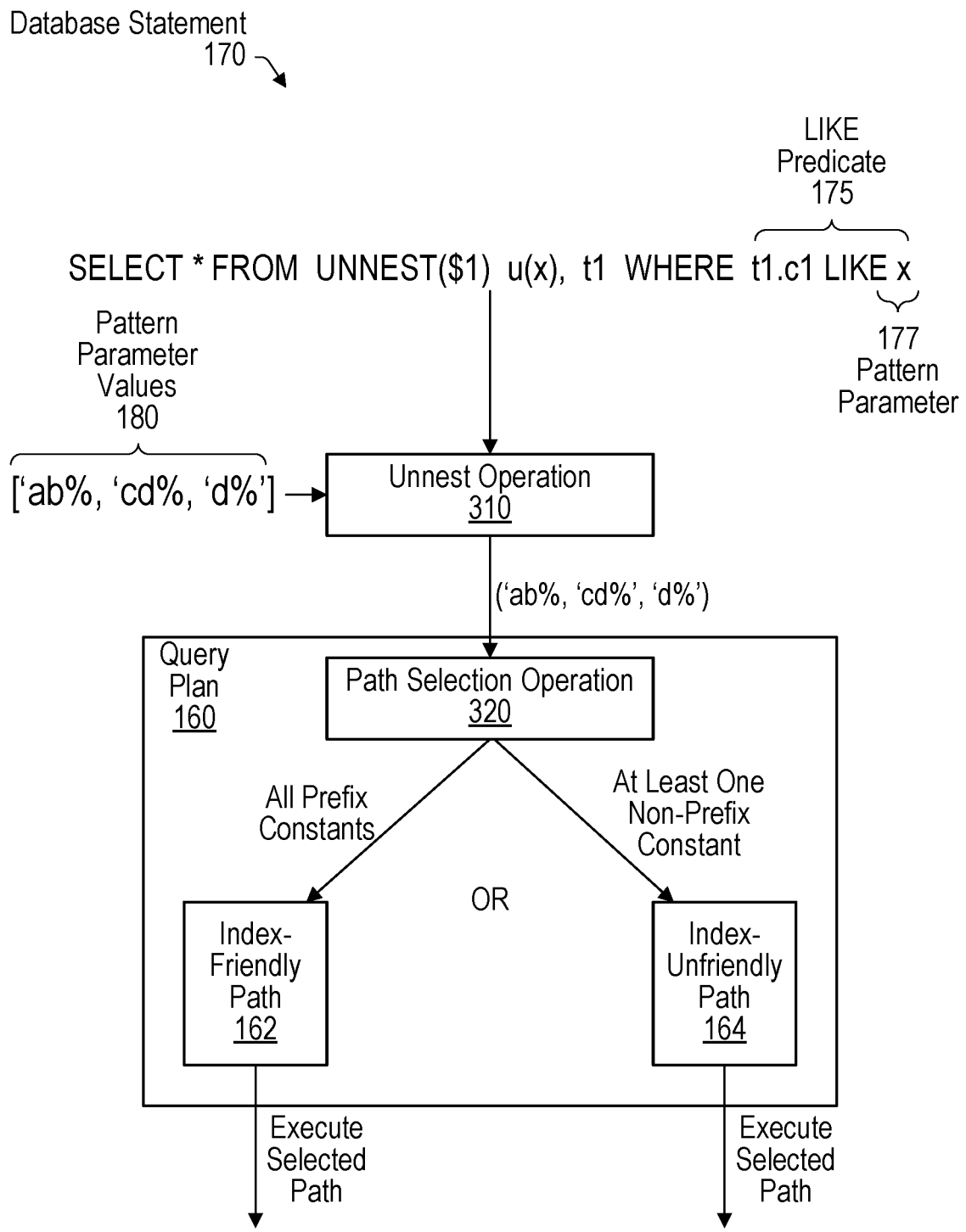

Turning now to FIG. 3B, a block diagram of an example execution of a query plan 160 that comprises index-friendly path 162 and index-friendly path 164 is shown. In the illustrated embodiment, there is a database statement 170 comprising a LIKE predicate 175 with a pattern parameter 177; however, database statement 170 does not define pattern parameter values 180 for that pattern parameter 177. As discussed, in various cases, pattern parameter values 180 are provided to query execution engine 154 (e.g., as part of a request to execute database statement 170) during the execution phase of database statement 170, which occurs temporally after the query planning phase in which query plan 160 was generated. In some cases, pattern parameter values 180 may be provided in an array and thus query planning engine 152 executes an unnest operation 310 to extract pattern parameter values 180 from that array. While unnest operation 310 is shown separately from query plan 160, it may be a part of query plan 160.

Once pattern parameter values 180 have been extracted and are available for evaluation, then query execution engine 154 executes path selection operation 320 to evaluate values 180 to determine whether they are prefix constants. If they are prefix constants (which is the case in the illustrated embodiment), then query execution engine 154 selects and executes index-friendly path 162. But, in various embodiments, if at least one of pattern parameter values 180 is a non-prefix constant, then query execution engine 154 selects and executes index-unfriendly path 164. Query execution engine 154 may execute database statement 170 with a first set of pattern parameter values 180 that are all prefix constants and thus execute index-friendly path 162, and subsequently query execution engine 154 may execute database statement 170 with a second set of pattern parameter values 180 that are not all prefix constants and thus execute index-unfriendly path 164. Thus, the execution of the same database statement 170, but using different pattern parameter values 180, can result in query execution engine 154 switching between index-friendly path 162 and index-unfriendly path 164 based on the particular patterns provided at runtime.

While multiple pattern parameter values 180 are shown, in some cases, the execution of database statement 170 may involve a single pattern parameter value 180. Similarly, query execution engine 154 may select between index-friendly path 162 and index-unfriendly path 164 based on whether that single pattern parameter value 180 is a prefix constant. Also, while pattern parameter values 180 are shown as being passed in as an array, pattern parameter values 180 may be passed in as other data constructs (e.g., a string) or thorough particular mechanisms (e.g., they may be passed in as a result of another query).

Figure 4:
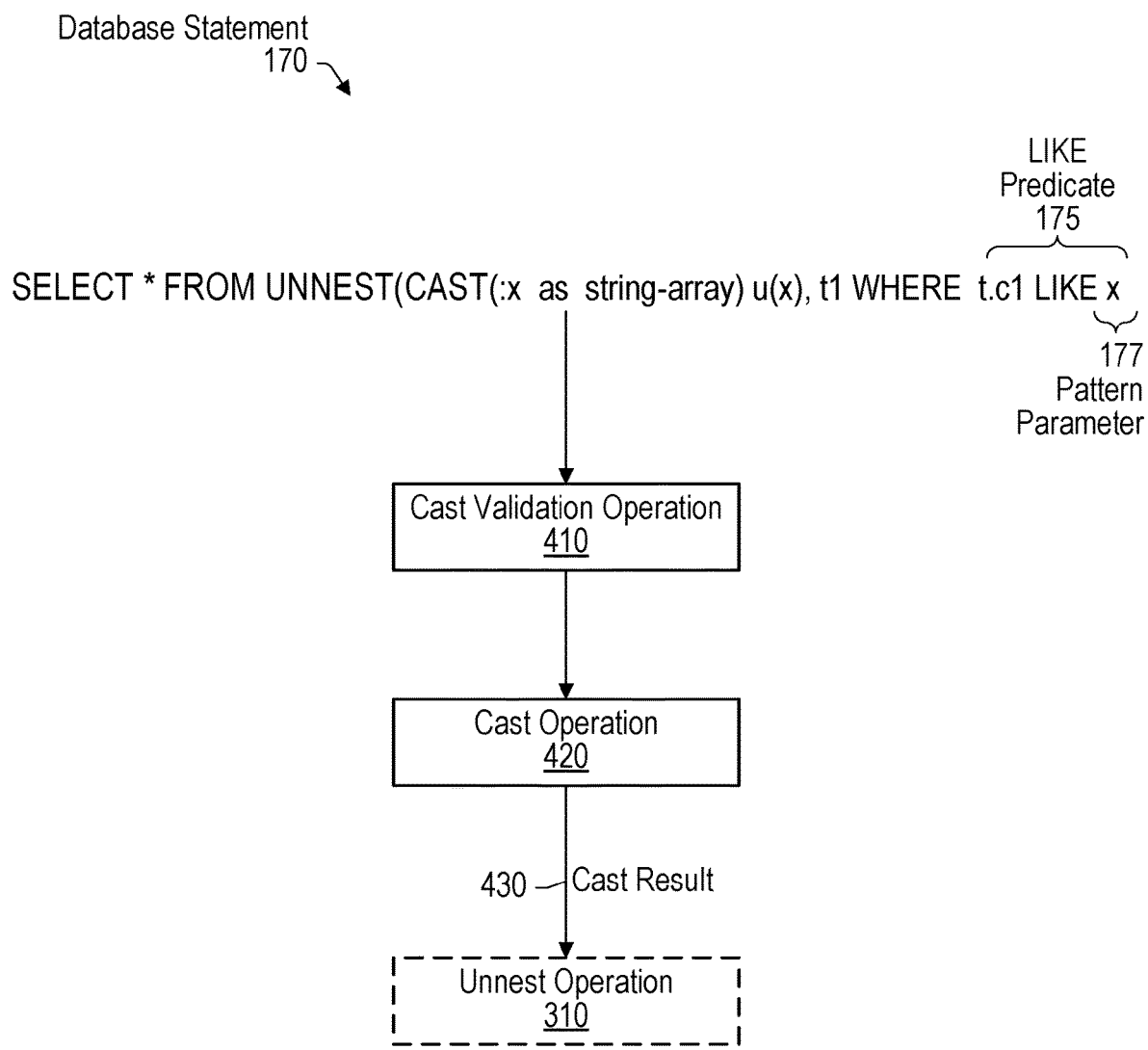
FIG. 4 is a block diagram illustrating example elements that pertain to processing a cast operation of a database statement having a LIKE predicate, according to some embodiments.

Turning now to FIG. 4, a block diagram of an example database statement 170 defining a cast operation associated with a LIKE predicate 175 is shown. In the illustrated embodiment, database statement 170 defines a cast operation to cast a passed-in data structure (denoted as ": x") to a string array, which may be unnested to obtain pattern parameter values 180. During the query planning phase of database statement 170, in various embodiments, query planning engine 152 performs a cast validation operation 410 to determine whether the cast operation is permitted. In particular, a cast operation may involve tunneling from an initial type through a set of other types (the set may be zero) to a target type. Query planning engine 152 may ensure that it is safe to transition through the types. For example, type casting between a varchar type to a blank padded character (bpchar) type is permitted and thus query planning engine 152 may construct a query plan 160 having the appropriate casting operation(s) 420 in place in order to achieve that.

In order to ensure that a cast between types is permitted, in various embodiments, query planning engine 152 examines a portion of a parse tree (generated by a query parser discussed above) that defines cast operators on certain types involved in database statement 170. Query planning engine 152 may determine whether a given cast operator is permitted and whether it is safe to execute that cast operator on the underlying type—that is whether the underlying type is a compatible type with that cast operator. As an example, a cast operator may convert a data structure into an array of strings. But if that data structure is of a type that cannot be converted into an array of strings, then it is not safe to execute the cast operator. As such, query planning engine 152, in various embodiments, examines the node structures of a parse tree to determine what cast operator(s) are involved and if the underlying types (being casted) match compatible, expected types for those cast operators. If an initial type can be cast to a target type (which can involve one or more intermediary types), then query planning engine 152 creates a query plan 160 having the appropriate casting operation(s) 420 to implement the cast operator(s) that are involved in casting a data structure from the initial type to the target type.

When query plan 160 is executed, in various embodiments, query execution engine 154 performs the casting operation(s) 420 to implement the cast specified in database statement 170. A cast result 430 from the cast operation(s) 420 may be used in other operations, such as unnest operation 310 and/or path selection operation 320. For example, query execution engine 154 may perform the casting operation(s) 420 to cast a data structure (that includes one or more pattern parameter values 180) to a text array data structure in which those one or more pattern parameter values 180 are strings. Query execution engine 154 may thereafter execute unnest operation 310 to obtain those pattern parameter values 180 from the array data structure. Query execution engine 154 may then execute path selection operation 320 to determine which path to selected based on whether the pattern parameter values 180 are prefix constants.

Figure 5:
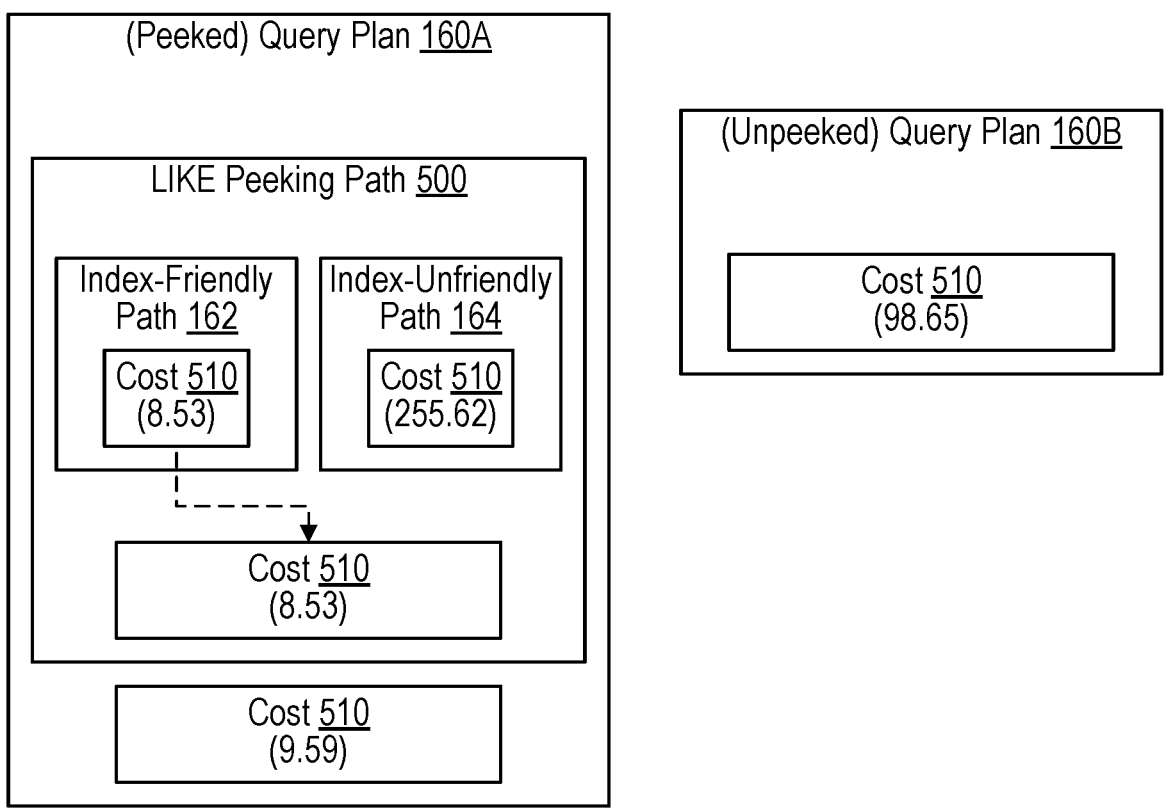
FIG. 5 is a block diagram illustrating example estimated execution costs for a peeked query plan and an unpeeked query plan, according to some embodiments.

Turning now to FIG. 5, a block diagram of example execution costs for a peeked query plan and an unpeeked query plan is shown. In the illustrated embodiment, there are two query plans 160: a peeked query plan 160A and an unpeeked query plan 160B. Also as shown, peeked query plan 160A that is associated with an estimated execution cost 510 and includes a LIKE peeking path 500 containing index-friendly path 162 and index-unfriendly path 164. As further shown, unpeeked query plan 160B, LIKE peeking path 500, index-friendly path 162, and also index-unfriendly path 164 are each associated with a respective estimated execution cost 510.

As discussed, there may be alternative ways to execute a given database statement 170, each with varying performance. In various embodiments, query planning engine 152 generates a query plan 160 for one or more of those alternative ways and assigns an estimated execution cost 510 to that query plan and its subcomponents (e.g., LIKE peeking path 500). An estimated execution cost 510, in various embodiments, identifies an estimated amount of time to execute a query/database statement 170 using a corresponding plan 160. An execution cost 510 might be expressed as two numbers: a start-up cost (cost expended before fetching any records) and a total cost (assuming all desired records are fetched). The values of the costs 510 presented in FIG. 5 correspond to the total cost. While an estimated execution cost 510 may be a time cost, in some embodiments, an estimated execution cost 510 may express another type of cost, such as a computational cost.

To generate an estimated execution cost 510, query planning engine 152 may evaluate one or more factors. For example, query planning engine 152 may consider the complexity of the particular database statement 170 as one that involves multiple joins, subqueries, or complex conditions tend to be more costly. As other examples, query planning engine 152 may consider the amount of data being processed (as larger datasets generally need more time), the available hardware resources (e.g., CPU, memory, disk speed, etc.) and the way the database uses them, and whether indexes 130 can be used. Query planning engine 152 may also consider statistics on data distribution and historical query performance.

LIKE peeking path 500, in various embodiments, is a path that includes index-friendly path 162 and index-unfriendly path 164 as subpaths. Accordingly, the estimated execution cost 510 of LIKE peeking path 500 can be dependent on the estimated execution cost 510 of index-friendly path 162 and/or index-unfriendly path 164. But in various embodiments, the estimated execution cost 510 of LIKE peeking path 500 is based on the estimated execution cost 510 of only index-friendly path 162 and not index-unfriendly path 164, as shown. While the estimated execution costs 510 of LIKE peeking path 500 and index-friendly path 162 are the same in FIG. 5, in various cases, the estimated execution cost 510 of LIKE peeking path 500 is higher than the estimated execution cost 510 of index-friendly path 162 due to additional overhead cost of LIKE peeking path 500. In various embodiments, the cost 510 of peeked query plan 160A is based on the cost 510 of LIKE peeking path 500. Since the cost 510 of LIKE peeking path 500 is based on the cost 510 of index-friendly path 162, the cost 510 of peeked query plan 160A is lower than it would otherwise be if LIKE peeking path 500 was based on the cost 510 of index-unfriendly path 164.

When determining which query plan 160 to execute, in various embodiments, database node 140 evaluates their cost 510 and executes the query plan 160 with the lowest cost 510. In the illustrated embodiment, peeked query plan 160A (which involves using the LIKE peeking approach) has a cost 510 of 9.59 while unpeeked query plan 160B (which does not involve the LIKE peeking approach) has a cost 510 of 98.65. Thus, database node 140 selects peeked query plan 160A over unpeeked plan 160B, in various embodiments. By basing the cost 510 of LIKE peeking path 500 on the cost 510 of index-friendly path 162 and not the more expensive cost 510 of index-unfriendly path 164, peeked query plan 160A is assigned a lower overall cost 510 than unpeeked query plan 160B even though the cost 510 of query plan 160B is lower than the cost 510 of index-unfriendly path 164. As a result, a given peeked query plan 160 may be more attractive to database node 140 compared to an unpeeked query plan 160. Thus, LIKE peeking path 500 may be used more often in query plans 160.

In some embodiments, query planning engine 152 may produce a single query plan 160 for a particular database statement 170. There might be multiple paths that can be included in that query plan 160, including LIKE peeking path 500. By basing the cost 510 of LIKE peeking path 500 on the cost 510 of index-friendly path 162 and not index-unfriendly path 164, LIKE peeking path 500 may be selected over an alternative path for inclusion in a query plan 160. In some cases, that alternate path may have an estimated execution cost 510 that is greater than the cost 510 of index-friendly path 162 but less than the cost 510 of index-unfriendly path 164. By basing the cost 510 of LIKE peeking path 500 on the cost 510 of index-friendly path 162, LIKE peeking path 500 may be used more often in query plans 160 over alternative paths.

Figure 6:
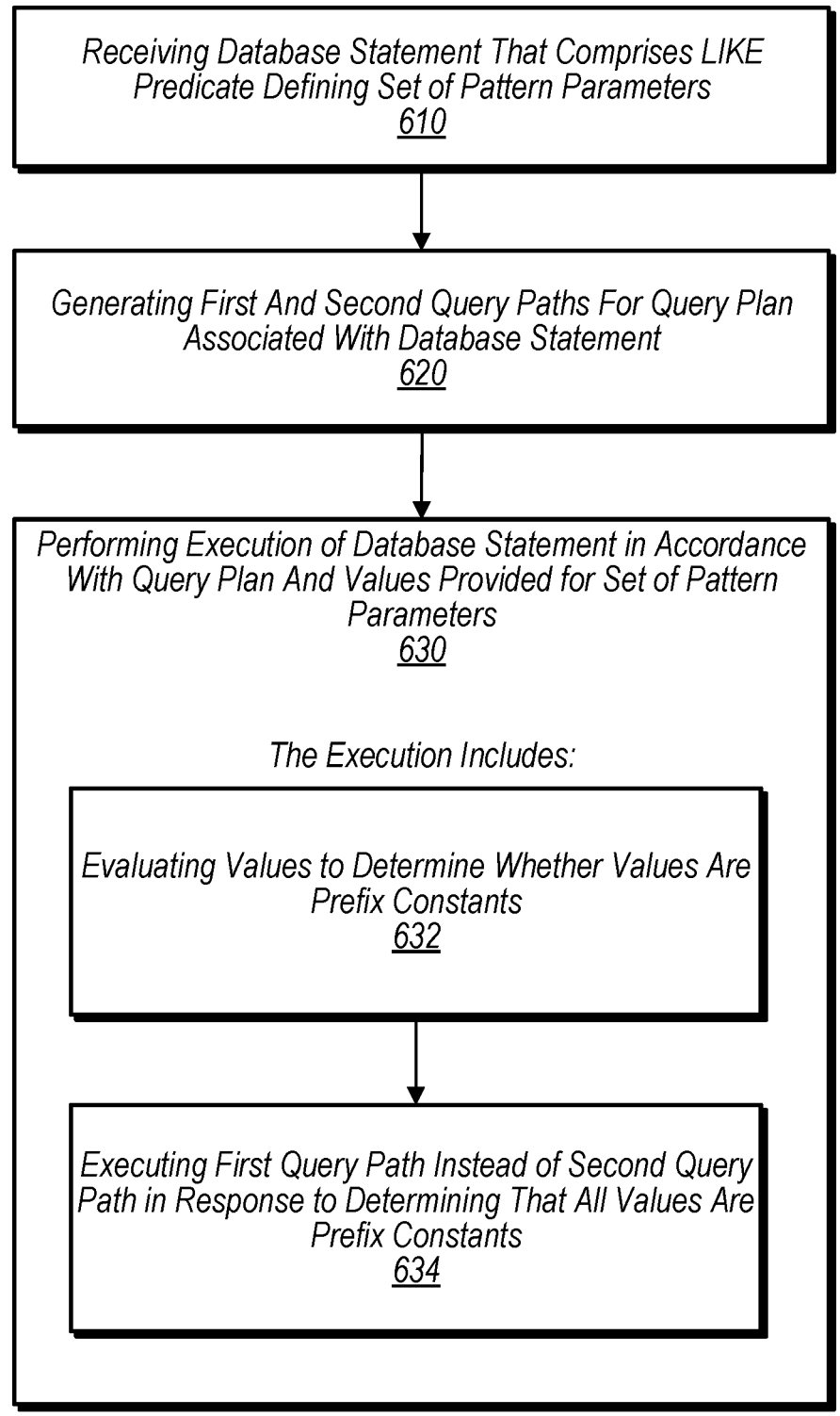
FIG. 6 is a flow diagram illustrating an example method relating to executing a database statement having a LIKE predicate, according to some embodiments.

Turning now to FIG. 6, a flow diagram of a method 600 is shown. Method 600 is one embodiment of a method performed by a computer system (e.g., database node 140) that relates to executing a database statement (e.g., a database statement 170) containing a LIKE predicate (e.g., a LIKE predicate 175). Method 600 may be performed by executing program instructions stored on a non-transitory computer-readable medium. Also, at least a portion of method 600 (e.g., steps 630, 632, and 634) may be performed in response to a user submitting a request to execute the database statement. Method 600 may include more or less steps than shown. As an example, method 600 may include a step in which an unnest or cast operation is performed as part of executing the database statement.

Method 600 begins in step 610 with a computer system receiving a database statement that comprises a LIKE predicate defining a set of pattern parameters (e.g., pattern parameters 177). In step 620, the computer system generates first and second query paths for a query plan (e.g., a query plan 160) associated with the database statement. The first query path (e.g., index-friendly path 162) utilizes an index (e.g., an index 130) associated with a database table (e.g., a table 120) specified by the database statement and the second query path (e.g., index-friendly path 162) does not utilize the index.

In step 630, the computer system performs a first execution of the database statement in accordance with the query plan and values (e.g., pattern parameter values 180) provided for the set of pattern parameters. In some cases, the values are provided to the computer system during an execution phase associated with the database statement that occurs temporally after a query planning phase in which the first and second query paths of the query plan are generated. For example, the values can be extracted during the first execution from an unnest operation of the database statement But in some cases, the values are specified in the database statement that is received by the computer system prior to the generation of the query plan. In some cases, the database statement includes a cast operation on a data structure that includes the values. The computer system may determine whether the cast operation casts the data structure as a text data structure and then extract the values in response to determining that the cast operation casts the data structure as a text data structure.

In step 632, as a part of performing the first execution, the computer system evaluates the values to determine whether those values are prefix constants. In step 634, the computer system executes the first query path instead of the second query path in response to determining that all the values are prefix constants. The computer system may perform a second execution of the database statement in accordance with the query plan but with different values provided for the set of pattern parameters. The second execution may include executing the second query path instead of the first query path in response to determining that at least one of the different values is not a prefix constant.

The computer system may receive another database statement that comprises a LIKE predicate that defines other values for another set of pattern parameters. The computer system may evaluate the other values to determine whether the other values are prefix constants, and in response to determining that all the other values are prefix constants, the computer system may generate a query plan that includes a query path that utilizes an index associated with a database table specified by the other database statement. The computer system may receive a database statement that comprises a LIKE predicate defining at least one pattern parameter and a cast operation on a value of the at least one pattern parameter. The computer system may generate a query plan for the database statement that, when executed, involves performing the cast operation as part of evaluating the LIKE predicate.

In various embodiments, the first and second query paths are subpaths of a LIKE path (e.g., LIKE peeking path 500) having a particular estimated execution cost (e.g., a cost 510) that corresponds to a first estimated execution cost of the first query path and not a second estimated execution cost of the second query path. The execution cost of the query plan may be based on the particular estimated execution cost of the LIKE path. In various cases, the first estimated execution cost of the first query path is less than the second estimated execution cost of the second query path. The computer system may select the LIKE path to include in the query plan over an alternative path, where the alternate path has an estimated execution cost greater than the first estimated execution cost of the first query path but less than the second estimated execution cost of the second query path.

Exemplary Computer System

Figure 7:
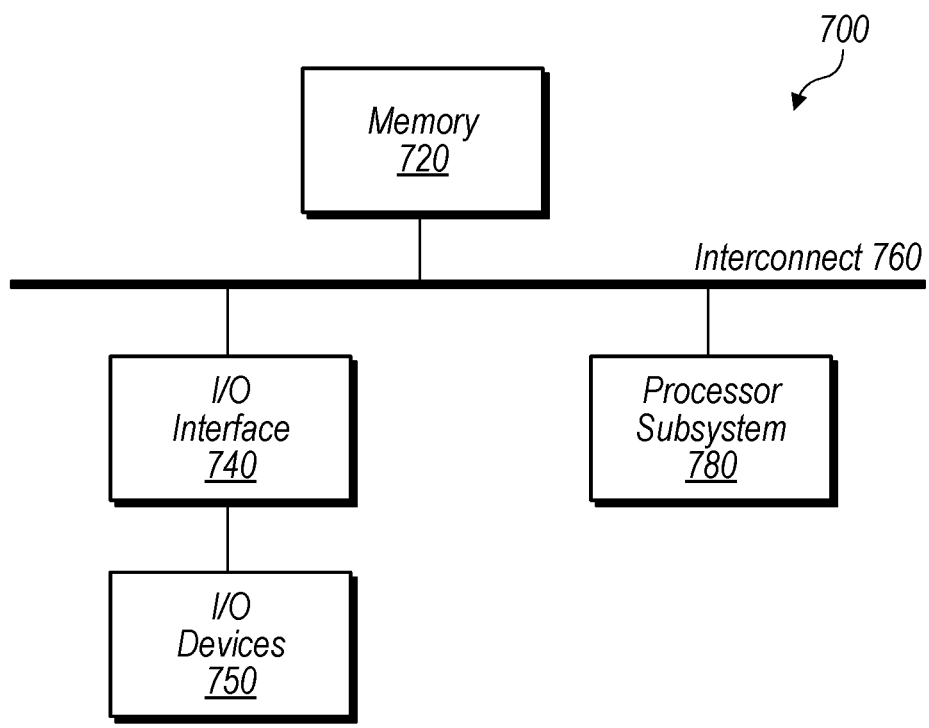
FIG. 7 is a block diagram illustrating elements of a computer system for implementing various systems described in the present disclosure, according to some embodiments.

Turning now to FIG. 7, a block diagram of an exemplary computer system 700, which may implement system 100, database 110, and/or database node 140, is depicted. Computer system 700 includes a processor subsystem 780 that is coupled to a system memory 720 and I/O interfaces(s) 740 via an interconnect 760 (e.g., a system bus). I/O interface(s) 740 is coupled to one or more I/O devices 750. Although a single computer system 700 is shown in FIG. 7 for convenience, system 700 may also be implemented as two or more computer systems operating together.

Processor subsystem 780 may include one or more processors or processing units. In various embodiments of computer system 700, multiple instances of processor subsystem 780 may be coupled to interconnect 760. In various embodiments, processor subsystem 780 (or each processor unit within 780) may contain a cache or other form of on-board memory.

System memory 720 is usable store program instructions executable by processor subsystem 780 to cause system 700 perform various operations described herein. System memory 720 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as memory 720. Rather, computer system 700 may also include other forms of storage such as cache memory in processor subsystem 780 and secondary storage on I/O Devices 750 (e.g., a hard drive, storage array, etc.). In some embodiments, these other forms of storage may also store program instructions executable by processor subsystem 780. In various embodiments, program instructions executable to implement database application 150, query planning engine 152, and/or query execution engine 154 are included/stored within system memory 720.

I/O interfaces 740 may be any of various types of interfaces configured to couple to and communicate with other devices, according to various embodiments. In one embodiment, I/O interface 740 is a bridge chip (e.g., Southbridge) from a front-side to one or more back-side buses. I/O interfaces 740 may be coupled to one or more I/O devices 750 via one or more corresponding buses or other interfaces. Examples of I/O devices 750 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device 750 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112 (f) for that claim element. Should Applicant wish to invoke Section 112 (f) during prosecution of a United States patent application based on this disclosure, it will recite claim elements using the "means for" [performing a function] construct.

What is claimed is:

1. A method, comprising:
    receiving, by a computer system, a database statement that comprises a LIKE predicate defining a set of pattern parameters;
    generating, by the computer system, a query plan to execute the database statement, wherein the query plan includes a first query path that utilizes an index associated with a database table specified by the database statement and a second query path that does not utilize the index; and
    performing, by the computer system, a first execution of the database statement in accordance with the query plan and values provided for the set of pattern parameters, wherein the first execution includes:
        evaluating the values to determine whether the values are prefix constants; and
        executing the first query path of the query plan instead of the second query path of the query plan in response to determining that all the values are prefix constants.

2. The method of claim 1, wherein the values are provided to the computer system during an execution phase associated with the database statement that occurs temporally after a query planning phase in which the first and second query paths of the query plan are generated.

3. The method of claim 1, further comprising:
    receiving, by the computer system, another database statement that comprises a LIKE predicate defining other values for another set of pattern parameters;
    evaluating, by the computer system, the other values to determine whether the other values are prefix constants; and
    in response to determining that all the other values are prefix constants, the computer system generating a query plan that includes a query path that utilizes an index associated with a database table specified by the other database statement.

4. The method of claim 1, further comprising:
    receiving, by the computer system, another database statement that comprises a LIKE predicate defining at least one pattern parameter and a cast operation associated with the at least one pattern parameter; and
    generating, by the computer system, a query plan for the other database statement that, when executed, involves performing the cast operation as part of evaluating the LIKE predicate of the other database statement.

5. The method of claim 1, wherein the values are extracted during the first execution from an unnest operation of the database statement.

6. The method of claim 5, wherein the unnest operation includes a cast operation on a data structure that stores the values, and wherein the method further comprises:

determining, by the computer system, whether the cast operation casts the data structure as a text data structure; and extracting, by the computer system, the values in response to determining that the cast operation casts the data structure as a text data structure.

7. The method of claim 1, wherein the first and second query paths are subpaths of a LIKE path having a particular estimated execution cost that corresponds to a first estimated execution cost of the first query path and not a second estimated execution cost of the second query path, and wherein an execution cost of the query plan is based on the particular estimated execution cost of the LIKE path.

8. The method of claim 7, wherein the first estimated execution cost of the first query path is less than the second estimated execution cost of the second query path.

9. The method of claim 7, further comprising:

selecting, by the computer system, the LIKE path to include in the query plan over an alternative path, wherein the alternate path has an estimated execution cost that is greater than the first estimated execution cost of the first query path but less than the second estimated execution cost of the second query path.

10. The method of claim 1, further comprising:

performing, by the computer system, a second execution of the database statement in accordance with the query plan but with different values provided for the set of pattern parameters, wherein the second execution includes executing the second query path instead of the first query path in response to determining that at least one of the different values is not a prefix constant.

11. A non-transitory computer readable medium having program instructions stored thereon that are executable by a computer system to cause the computer system to perform operations comprising:

receiving a database statement that comprises a LIKE predicate defining a set of pattern parameters;

generating a query plan to execute the database statement, wherein the query plan includes a first query path that utilizes an index associated with a database table specified by the database statement and a second query path that does not utilize the index; and executing the database statement in accordance with the query plan and values provided for the set of pattern parameters, wherein the executing includes:

evaluating the values to determine whether the values are prefix constants; and selecting the first query path of the query plan instead of the second query path of the query plan for execution in response to determining that all the values are prefix constants.

12. The non-transitory computer readable medium of claim 11, wherein the operations further comprise:

selecting the second query path instead of the first query path for execution in response to determining that at least one of the values is not a prefix constant.

13. The non-transitory computer readable medium of claim 11, wherein the operations further comprise:

assigning a first estimated execution cost to the first query path; and assigning a second estimated execution cost to the second query path that is greater than the first estimated execution cost of the first query path, wherein an estimated execution cost of the query plan is based on the first estimated execution cost but not the second estimated execution cost.

14. The non-transitory computer readable medium of claim 11, wherein the values are provided to the computer system during an execution phase associated with the database statement that occurs temporally after a query planning phase in which the first and second query paths of the query plan are generated.

15. The non-transitory computer readable medium of claim 11, wherein the LIKE predicate defines a cast operation associated with at least one of the set of pattern parameters, wherein the executing includes performing the cast operation as part of evaluating the LIKE predicate.

16. A system, comprising:

at least one processor; and a memory having program instructions stored thereon that are executable by the at least one processor to cause the system to perform operations comprising:

receiving a database statement that comprises a LIKE predicate defining a set of pattern parameters;

generating a query plan to execute the database statement, wherein the query plan includes a first query path that utilizes an index associated with a database table specified by the database statement and a second query path that does not utilize the index; and executing the database statement in accordance with the query plan and values provided for the set of pattern parameters, wherein the executing includes:

evaluating ones of the values to determine whether the values are prefix constants; and selecting the first query path of the query plan instead of the second query path of the query plan for execution in response to determining that all the values are prefix constants.

17. The system of claim 16, wherein the operations further comprise:

selecting the second query path instead of the first query path for execution in response to determining that at least one of the values is not a prefix constant.

18. The system of claim 16, wherein the operations further comprise:

assigning a first estimated execution cost to the first query path and a second estimated execution cost to the second query path, wherein an estimated execution cost of the query plan is based on the first estimated execution cost but not the second estimated execution cost.

19. The system of claim 16, wherein the values are provided to the system during the executing of the database statement and not during the generating of the first and second query paths for the query plan.

20. The system of claim 16, wherein the LIKE predicate defines a cast operation on a value of at least one of the set of pattern parameters, and wherein the executing includes performing the cast operation on the value of the at least one pattern parameter.

* * * * *